US012723313B2

(12) United States Patent
Matthews et al.

(10) Patent No.: US 12,723,313 B2
(45) Date of Patent: Sep. 1, 2026

(54) INTEGRATED HYDROGEN PRODUCTION SYSTEM AND METHOD OF USE

(71) Applicant: Utility Global, Inc., Houston, TX (US)

(72) Inventors: Paul Matthews, Katy, TX (US); Matthew Dawson, Katy, TX (US); Nicholas Farandos, Bray (IE); Jin Dawson, Katy, TX (US)

(73) Assignee: Utility Global, Inc., Houston, TX (US)

(*) Notice: Subject to any disclaimer, the term of this patent is extended or adjusted under 35 U.S.C. 154(b) by 519 days.

(21) Appl. No.: 18/469,921

(22) Filed: Sep. 19, 2023

(65) Prior Publication Data

US 2024/0133052 A1 Apr. 25, 2024
US 2024/0229253 A9 Jul. 11, 2024

Related U.S. Application Data

(60) Provisional application No. 63/417,749, filed on Oct. 20, 2022.

(51) Int. Cl.

| | |
|---|---|
| ***C25B 1/042*** | (2021.01) |
| ***C01B 3/26*** | (2006.01) |
| ***C25B 3/23*** | (2021.01) |
| ***C25B 9/01*** | (2021.01) |
| ***C25B 9/23*** | (2021.01) |
| ***C25B 11/04*** | (2021.01) |
| ***C25B 11/091*** | (2021.01) |
| ***C25B 13/07*** | (2021.01) |
| ***C25B 15/08*** | (2006.01) |

(52) U.S. Cl.

CPC ................ *C25B 1/042* (2021.01); *C01B 3/26* (2013.01); *C25B 3/23* (2021.01); *C25B 9/01* (2021.01); *C25B 9/23* (2021.01); *C25B 11/04* (2013.01); *C25B 11/091* (2021.01); *C25B 13/07* (2021.01); *C25B 15/08* (2013.01); *C01B 2203/0261* (2013.01); *C01B 2203/1058* (2013.01)

(58) Field of Classification Search

CPC .. C01B 3/26; C25B 1/042; C25B 9/23; C25B 9/65; C25B 15/08

See application file for complete search history.

(56) References Cited

U.S. PATENT DOCUMENTS 6,037,514 A * 3/2000 White .................... B01J 23/002 585/510
11,788,022 B1 * 10/2023 Lamaison .................. C10J 3/00 205/435

(Continued)

*Primary Examiner* — Brian W Cohen
(74) *Attorney, Agent, or Firm* — Foley & Lardner LLP

(57) ABSTRACT

Herein discussed is a method of producing hydrogen comprising: providing a tubular reactor having an open end and a closed end, wherein the reactor comprises an anode on the inside and a cathode on the outside separated by and in contact with a mixed conducting electrolyte, wherein the electrolyte comprises an electronically conducting phase and an ionically conducting phase, wherein the reactor comprises no current collector or interconnect; introducing a hydrocarbon and an oxidant into a feed tube, wherein the feed tube contains a catalyst that promotes catalytic partial oxidation (CPOX) reactions, wherein the feed tube extends into the open end of the reactor and toward the closed end of the reactor; introducing steam to the outside of the tubular reactor; and converting steam to hydrogen electrochemically without electricity input.

24 Claims, 2 Drawing Sheets

(56) References Cited

U.S. PATENT DOCUMENTS

| | | | |
|---|---|---|---|
| 11,879,179 B2 * | 1/2024 | Dawson | C01B 3/386 |
| 2020/0140297 A1 | 5/2020 | Hall et al. | |
| 2020/0144627 A1 | 5/2020 | Hall et al. | |
| 2020/0144628 A1 | 5/2020 | Hall et al. | |
| 2020/0144633 A1 | 5/2020 | Hall et al. | |
| 2020/0144635 A1 | 5/2020 | Hall et al. | |
| 2020/0144646 A1 | 5/2020 | Hall et al. | |
| 2020/0144647 A1 | 5/2020 | Hall et al. | |
| 2020/0144648 A1 | 5/2020 | Hall et al. | |
| 2020/0144653 A1 | 5/2020 | Hall et al. | |
| 2020/0144654 A1 | 5/2020 | Hall et al. | |
| 2020/0156104 A1 | 5/2020 | Hall et al. | |
| 2020/0176803 A1 | 6/2020 | Hall et al. | |
| 2020/0182549 A1 | 6/2020 | Hall et al. | |
| 2020/0227763 A1 | 7/2020 | Hall et al. | |
| 2020/0235409 A1 | 7/2020 | Hall et al. | |
| 2020/0235410 A1 | 7/2020 | Hall et al. | |
| 2020/0255959 A1 | 8/2020 | Hall et al. | |
| 2020/0255962 A1 | 8/2020 | Hall et al. | |
| 2020/0255963 A1 | 8/2020 | Hall et al. | |
| 2020/0259186 A1 | 8/2020 | Hall et al. | |
| 2020/0303749 A1 | 9/2020 | Hall et al. | |
| 2021/0024425 A1 | 1/2021 | Dawson et al. | |
| 2021/0069786 A1 | 3/2021 | Hall et al. | |
| 2021/0121978 A1 | 4/2021 | Dawson et al. | |
| 2021/0175531 A1 | 6/2021 | Farandos et al. | |
| 2022/0364245 A1 | 11/2022 | Farandos et al. | |
| 2022/0364251 A1 | 11/2022 | Dawson et al. | |
| 2022/0372635 A1 | 11/2022 | Farandos et al. | |
| 2022/0380210 A1 | 12/2022 | Farandos et al. | |
| 2022/0403532 A1 | 12/2022 | Farandos et al. | |
| 2023/0002915 A1 | 1/2023 | Dawson et al. | |
| 2023/0013911 A1 | 1/2023 | Dawson et al. | |
| 2023/0020427 A1 | 1/2023 | Farandos et al. | |
| 2023/0092683 A1 | 3/2023 | Farandos et al. | |
| 2023/0109683 A1 | 4/2023 | Dawson et al. | |
| 2023/0167560 A1 | 6/2023 | Dawson et al. | |
| 2023/0175143 A1 | 6/2023 | Farandos et al. | |
| 2024/0133062 A1 | 4/2024 | Dawson et al. | |

* cited by examiner

INTEGRATED HYDROGEN PRODUCTION SYSTEM AND METHOD OF USE

CROSS-REFERENCE TO RELATED APPLICATIONS

This application claims the benefit under 35 U.S.C. 119(e) of U.S. Provisional Patent Application No. 63/417,749 filed Oct. 20, 2022, the entire disclosure of which is hereby incorporated herein by reference.

TECHNICAL FIELD

This invention generally relates to hydrogen production. More specifically, this invention relates to hydrogen production involving electrochemical pathways.

BACKGROUND

Hydrogen in large quantities is needed in the petroleum and chemical industries. For example, large amounts of hydrogen are used in upgrading fossil fuels and in the production of ammonia or methanol or hydrochloric acid. Petrochemical plants need hydrogen for hydrocracking, hydrodesulfurization, hydrodealkylation. Hydrogenation processes to increase the level of saturation of unsaturated fats and oils also need hydrogen. Hydrogen is also a reducing agent of metallic ores. Hydrogen may be produced from electrolysis of water, steam reforming, lab-scale metal-acid process, thermochemical methods, or anaerobic corrosion. Many countries are aiming at a hydrogen economy.

The water-gas shift (WGS) reaction describes the reaction of carbon monoxide and water vapor to form carbon dioxide and hydrogen: $CO+H_2O\leftrightarrows CO_2+H_2$. The reverse water gas shift (RWGS) reaction is the reaction in the reverse direction, i.e., the reaction of carbon dioxide and hydrogen to form carbon monoxide and water. These two reactions, WGS and RWGS, are in equilibrium. The WGS equilibrium reactions are in many applications, such as in the production of ammonia, hydrocarbons, methanol, and hydrogen. It is often used in conjunction with steam reforming of methane and other hydrocarbons. In the Fischer-Tropsch process, the WGS equilibrium reaction is one of the most important reactions used to balance the $H_2$/CO ratio. In addition, WGS equilibrium reactions have been combined with the gasification of coal to produce hydrogen. Conventionally, WGS reactions are catalyzed by two categories of catalysts—high temperature shift (HTS) catalyst and low temperature shift (LTS) catalyst. The HTS catalyst consists of iron oxide stabilized by chromium oxide; the LTS catalyst is based on copper. To date, WGS equilibrium reactions have been performed chemically.

Contrary to conventional practice, this disclosure discusses an unexpected discovery of WGS reactions performed electrochemically. The electrochemical reactor and the method to perform such reactions are also discussed. In particular, this disclosure includes the discussion of methods and systems for hydrogen production.

SUMMARY

Herein discussed is a hydrogen production system comprising: a tubular reactor having an open end and a closed end, wherein the reactor comprises an anode on the inside and a cathode on the outside separated by and in contact with a mixed conducting electrolyte; a feed tube extending into the open end of the reactor and toward the closed end of the reactor, wherein the feed tube contains a catalyst that promotes catalytic partial oxidation (CPOX) reactions; and a steam generator; wherein the steam generator provides steam to the outside of the tubular reactor; and wherein the reactor comprises no current collector or interconnect.

In an embodiment, the reactor generates no electricity and receives no electricity. In an embodiment, both the anode and the cathode are exposed to reducing environments during the entire time of operation. In an embodiment, the feed tube is configured to receive a hydrocarbon and an oxidant. In an embodiment, the oxidant is consumed completely before exiting the feed tube.

In an embodiment, the cathode is configured to convert steam to hydrogen electrochemically. In an embodiment, the anode is configured to receive product of the CPOX reactions and oxidize the product electrochemically. In an embodiment, the anode and the cathode have the same elements. In an embodiment, the anode and the cathode and the electrolyte have the same elements.

In an embodiment, the anode and the cathode comprise Ni or NiO and a material selected from the group consisting of YSZ, CGO, SDC, SSZ, LSGM, and combinations thereof. In an embodiment, the electrolyte comprises an electronically conducting phase and an ionically conducting phase. In an embodiment, the electronically conducting phase comprises doped lanthanum chromite or an electronically conductive metal or combination thereof and wherein the ionically conducting phase comprises a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia (SCZ), and combinations thereof.

In an embodiment, the electrolyte comprises CoCGO or LST (lanthanum-doped strontium titanate)-stabilized zirconia. In an embodiment, the stabilized zirconia comprises YSZ or SSZ or SCZ (scandia-ceria-stabilized zirconia). In an embodiment, the LST comprises $LaSrCaTiO_3$. In an embodiment, the electrolyte comprises Nickel, Copper, Cobalt, Lanthanum, Strontium, Titanium, or Niobium-doped zirconia.

Also discussed herein is a method of producing hydrogen comprising: providing a tubular reactor having an open end and a closed end, wherein the reactor comprises an anode on the inside and a cathode on the outside separated by and in contact with a mixed conducting electrolyte, wherein the electrolyte comprises an electronically conducting phase and an ionically conducting phase, wherein the reactor comprises no current collector or interconnect; introducing a hydrocarbon and an oxidant into a feed tube, wherein the feed tube contains a catalyst that promotes catalytic partial oxidation (CPOX) reactions, wherein the feed tube extends into the open end of the reactor and toward the closed end of the reactor; introducing steam to the outside of the tubular reactor; and converting steam to hydrogen electrochemically without electricity input.

In an embodiment, both the anode and the cathode are exposed to reducing environments during the entire time of operation. In an embodiment, the oxidant is consumed completely before exiting the feed tube. In an embodiment, the anode and the cathode have the same elements. In an embodiment, the anode and the cathode and the electrolyte have the same elements.

In an embodiment, the anode and the cathode comprise Ni or NiO and a material selected from the group consisting of YSZ, CGO, SDC, SSZ, LSGM, and combinations thereof. In an embodiment, the electrolyte comprises CoCGO or LST (lanthanum-doped strontium titanate)-stabilized zirconia. In an embodiment, the stabilized zirconia comprises YSZ or SSZ or SCZ (scandia-ceria-stabilized zirconia). In an embodiment, the LST comprises $LaSrCaTiO_3$. In an embodiment, the electrolyte comprises Nickel, Copper, Cobalt, Lanthanum, Strontium, Titanium, or Niobium-doped zirconia.

Further aspects and embodiments are provided in the following drawings, detailed description, and claims. Unless specified otherwise, the features as described herein are combinable and all such combinations are within the scope of this disclosure.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Overview

Figure 1:
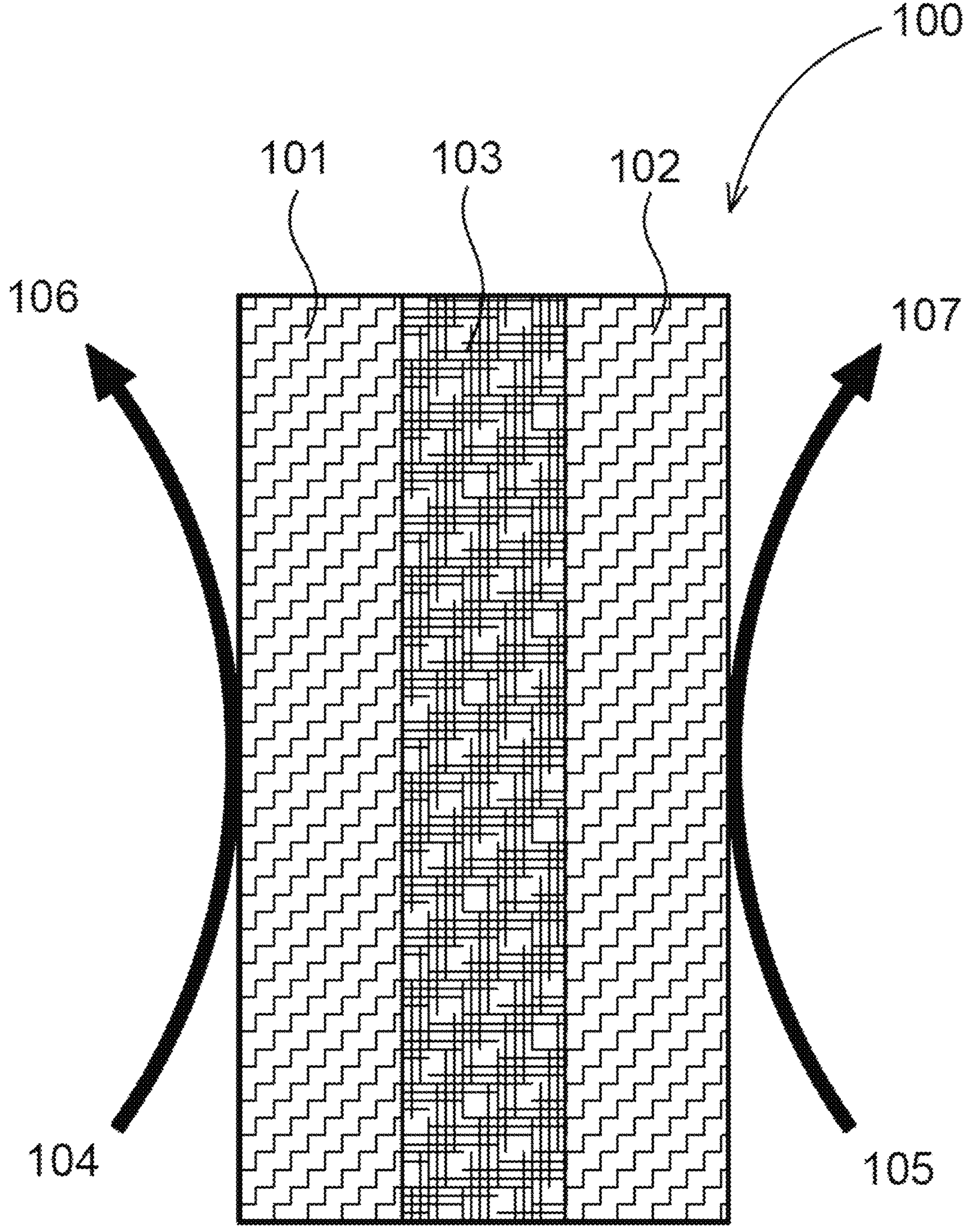
FIG. 1 illustrates an electrochemical reactor or an electrochemical (EC) gas producer, according to an embodiment of this disclosure.

In particular, this disclosure also discusses methods and systems for hydrogen production. Various components of the reactor are described such as electrodes and membranes along with materials of construction of the components. The following description recites various aspects and embodiments of the inventions disclosed herein. No particular embodiment is intended to define the scope of the invention. Rather, the embodiments provide non-limiting examples of various compositions and methods that are included within the scope of the claimed inventions. The description is to be read from the perspective of one of ordinary skill in the art. Therefore, information that is well-known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like. As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, compositions and materials are used interchangeably unless otherwise specified. Each composition/material may have multiple elements, phases, and components. Heating as used herein refers to actively adding energy to the compositions or materials.

As used herein, YSZ refers to yttria-stabilized zirconia; SDC refers to samaria-doped ceria; SSZ refers to scandia-stabilized zirconia; LSGM refers to lanthanum strontium gallate magnesite; ScCeSZ refers to Sc and Ce doped zirconia.

As used herein, CGO refers to Gadolinium-Doped Ceria, also known alternatively as gadolinia-doped ceria, gadolinium-doped cerium oxide, cerium(IV) oxide, gadolinium-doped, GDC, or GCO, (formula $Gd{:}CeO_2$). CGO and GDC are used interchangeably unless otherwise specified. Syngas (i.e., synthesis gas) in this disclosure refers to a mixture consisting primarily of hydrogen, carbon monoxide and carbon dioxide.

A mixed conducting membrane is able to transport both electrons and ions. Ionic conductivity includes ionic species such as oxygen ions (or oxide ions), protons, halogenide anions, chalcogenide anions. In various embodiment, the mixed conducting membrane of this disclosure comprises an electronically conducting phase and an ionically conducting phase.

In this disclosure, the axial cross section of the tubulars is shown to be circular, which is illustrative only and not limiting. The axial cross section of the tubulars is any suitable shape as known to one skilled in the art, such as square, square with rounded corners, rectangle, rectangle with rounded corners, triangle, hexagon, pentagon, oval, irregular shape, etc.

As used herein, ceria refers to cerium oxide, also known as ceric oxide, ceric dioxide, or cerium dioxide, is an oxide of the rare-earth metal cerium. Doped ceria refers to ceria doped with other elements, such as samaria-doped ceria (SDC), or gadolinium-doped ceria (GDC or CGO). As used herein, chromite refers to chromium oxides, which includes all the oxidation states of chromium oxides.

A layer or substance being impermeable as used herein refers to it being impermeable to fluid flow. For example, an impermeable layer or substance has a permeability of less than 1 micro darcy, or less than 1 nano darcy.

In this disclosure, sintering refers to a process to form a solid mass of material by heat or pressure, or a combination thereof, without melting the material to the extent of liquefaction. For example, material particles are coalesced into a solid or porous mass by being heated, wherein atoms in the material particles diffuse across the boundaries of the particles, causing the particles to fuse together and form one solid piece.

The term "in situ" in this disclosure refers to the treatment (e.g., heating or cracking) process being performed either at the same location or in the same device. For example, ammonia cracking taking place in the electrochemical device at the anode is considered in situ.

Electrochemistry is the branch of physical chemistry concerned with the relationship between electrical potential, as a measurable and quantitative phenomenon, and identifiable chemical change, with either electrical potential as an outcome of a particular chemical change, or vice versa. These reactions involve electrons moving between electrodes via an electronically-conducting phase (typically, but not necessarily, an external electrical circuit), separated by an ionically-conducting and electronically insulating membrane (or ionic species in a solution). When a chemical reaction is effected by a potential difference, as in electrolysis, or if electrical potential results from a chemical reaction as in a battery or fuel cell, it is called an electrochemical reaction. Unlike chemical reactions, in electrochemical reactions electrons (and necessarily resulting ions), are not transferred directly between molecules, but via the aforementioned electronically conducting and ionically conducting circuits, respectively. This phenomenon is what distinguishes an electrochemical reaction from a chemical reaction.

Related to the electrochemical device and methods of use, various components of the device are described such as electrodes and membranes along with materials of construction of the components. The following description recites various aspects and embodiments of the inventions disclosed herein. No particular embodiment is intended to define the scope of the invention. Rather, the embodiments provide non-limiting examples of various compositions and methods that are included within the scope of the claimed inventions. The description is to be read from the perspective of one of ordinary skill in the art. Therefore, information that is well-known to the ordinarily skilled artisan is not necessarily included.

An interconnect in an electrochemical device (e.g., a fuel cell) is often either metallic or ceramic that is placed between the individual cells or repeat units. Its purpose is to connect each cell or repeat unit so that electricity can be distributed or combined. An interconnect is also referred to as a bipolar plate in an electrochemical device. An interconnect being an impermeable layer as used herein refers to it being a layer that is impermeable to fluid flow.

In an embodiment, the reactor comprises porous electrodes that comprise metallic phase and ceramic phase, wherein the metallic phase is electronically conductive and wherein the ceramic phase is ionically conductive. In various embodiments, the electrodes have no current collector attached to them. In various embodiments, the reactor does not contain any current collector. Clearly, such a reactor is fundamentally different from any electrolysis device or fuel cell.

Electrochemical Reactor

FIG. 1 illustrates an electrochemical reactor or an electrochemical (EC) gas producer 100, according to an embodiment of this disclosure. EC gas producer device 100 comprises first electrode/anode 101, membrane/electrolyte 103, and a second electrode/cathode 102. First electrode 101 (also referred to as anode) is configured to receive a fuel 104. Stream 104 contains no oxygen. Second electrode 102 is configured to receive water (e.g., steam) as denoted by 105.

In an embodiment, reactor 100 is configured to receive product of CPOX reactions, e.g., syngas (104) to generate $H_2O$ and $CO_2$ (106) at the first electrode (101). The presence of inert gases, e.g., nitrogen, does not affect the performance of the reactor, which is a significant advantage of the reactor of this disclosure. As such, the product from CPOX reactions do not need to go through gas separation to be fed to reactor 100.

Reactor 100 is configured to receive water or steam (105) and to generate hydrogen (107) at the second electrode (102). In some cases, the second electrode receives a mixture of steam and hydrogen. Since water provides the oxide ion (which is transported through the membrane) needed to oxidize the fuel at the opposite electrode, water is considered the oxidant in this scenario. As such, the first electrode 101 is performing oxidation reactions in a reducing environment. In various embodiments, both the anode and the cathode are exposed to reducing environments during the entire time of operation.

In various embodiments, 103 represents an oxide ion conducting membrane. In an embodiment, the first electrode 101 and the second electrode 102 may comprise Ni—YSZ or NiO—YSZ. In an embodiment, the oxide ion conducting membrane 103 also conducts electrons.

In this disclosure, no oxygen means there is no oxygen present at first electrode 101 or at least not enough oxygen that would interfere with the reaction. Also, in this disclosure, water only means that the intended feedstock is water and does not exclude trace elements or inherent components in water. For example, water containing salts or ions is considered to be within the scope of water only. Water only also does not require 100% pure water but includes this embodiment. In embodiments, the hydrogen produced from second electrode 102 is pure hydrogen, which means that in the produced gas phase from the second electrode, hydrogen is the main component. In some cases, the hydrogen content is no less than 99.5%. In some cases, the hydrogen content is no less than 99.9%. In some cases, the hydrogen produced from the second electrode is the same purity as that produced from electrolysis of water.

In various embodiments, the electrochemical reactions at the anode and the cathode are spontaneous without the need to apply potential/electricity to the reactor. As such, the reactor does not contain a current collector. In an embodiment, the reactor comprises no interconnect. There is no need for electricity and such a device is not an electrolyzer. Since the electrolyte is mixed conducting, the reactor does not generate electricity and is not a fuel cell.

In an embodiment, the electrochemical reactor (or EC gas producer) is a device comprising a first electrode, a second electrode, and a membrane between the electrodes, wherein the first electrode and the second electrode comprise a metallic phase that does not contain a platinum group metal when the device is in use, and wherein the membrane is oxide ion conducting. In an embodiment, the anode and the cathode have the same elements. In an embodiment, the anode and the cathode and the electrolyte have the same elements. In an embodiment, the anode and the cathode comprise Ni or NiO and a material selected from the group consisting of YSZ, CGO, SDC, SSZ, LSGM, and combinations thereof.

In an embodiment, the electrolyte comprises an electronically conducting phase and an ionically conducting phase. In some cases, the electronically conducting phase comprises doped lanthanum chromite or an electronically conductive metal or combination thereof; and wherein the ionically conducting phase comprises a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia (SCZ), and combinations thereof. In an embodiment, the electrolyte comprises CoCGO or LST (lanthanum-doped strontium titanate)-stabilized zirconia. In an embodiment, the stabilized zirconia comprises YSZ or SSZ or SCZ (scandia-ceria-stabilized zirconia). In an embodiment, the LST comprises $LaSrCaTiO_3$. In an embodiment, the electrolyte comprises Nickel, Copper, Cobalt, Lanthanum, Strontium, Titanium, or Niobium-doped zirconia.

In an embodiment, the membrane comprises cobalt-CGO (CoCGO), i.e., cobalt doped CGO. In an embodiment, the membrane consists essentially of CoCGO. In an embodiment, the membrane consists of CoCGO. In an embodiment, the membrane comprises LST (lanthanum-doped strontium titanate)-YSZ or LST-SSZ or LST-SCZ (scandia-ceria-stabilized zirconia). In an embodiment, the membrane consists essentially of LST-YSZ or LST-SSZ or LST-SCZ. In an embodiment, the membrane consists of LST-YSZ or LST-SSZ or LST-SCZ. In this disclosure, LST-YSZ refers to a composite of LST and YSZ. In various embodiments, the LST phase and the YSZ phase percolate each other. In this disclosure, LST-SSZ refers to a composite of LST and SSZ. In various embodiments, the LST phase and the SSZ phase percolate each other. In this disclosure, LST-SCZ refers to a composite of LST and SCZ. In various embodiments, the LST phase and the SCZ phase percolate each other. YSZ, SSZ, and SCZ are types of stabilized zirconia's.

The electrochemical water gas shift reactions taking place in the reactor comprise electrochemical half-cell reactions, wherein the half-cell reactions are:

$$CO_{(gas)}+O^{2-}\leftrightarrows CO_{2(gas)}+2e^- \quad 1.$$

$$H_2O_{(gas)}+2e^-\leftrightarrows H_{2(gas)}+O^{2-} \quad 2.$$

$$H_{2(gas)}+O^{2-}\leftrightarrows H_2O_{(gas)}+2e^- \quad 3.$$

$$H_2O_{(gas)}+2e^-\leftrightarrows H_{2(gas)}+O^{2-} \quad 4.$$

In various embodiments, the half-cell reactions take place at triple phase boundaries, wherein the triple phase boundaries are the intersections of pores with the electronically conducting phase and the ionically conducting phase.

In an embodiment, the reactor is operated at a temperature no less than 500° C., or no less than 600° C., or no less than 700° C., or no less than 750° C., or no less than 800° C., or no less than 850° C., or no less than 900° C., or no less than 950° C., or no less than 1000° C. In various embodiment, the pressure differential between the first electrode and the second electrode is no greater than 2 psi, or no greater than 1.5 psi, or no greater than 1 psi. In an embodiment, the first stream enters the reactor at a pressure of no greater than 10 psi, or no greater than 5 psi, or no greater than 3 psi. In an embodiment, the second stream enters the reactor at a pressure of no greater than 10 psi, or no greater than 5 psi, or no greater than 3 psi.

Integrated Hydrogen Production

Figure 2:
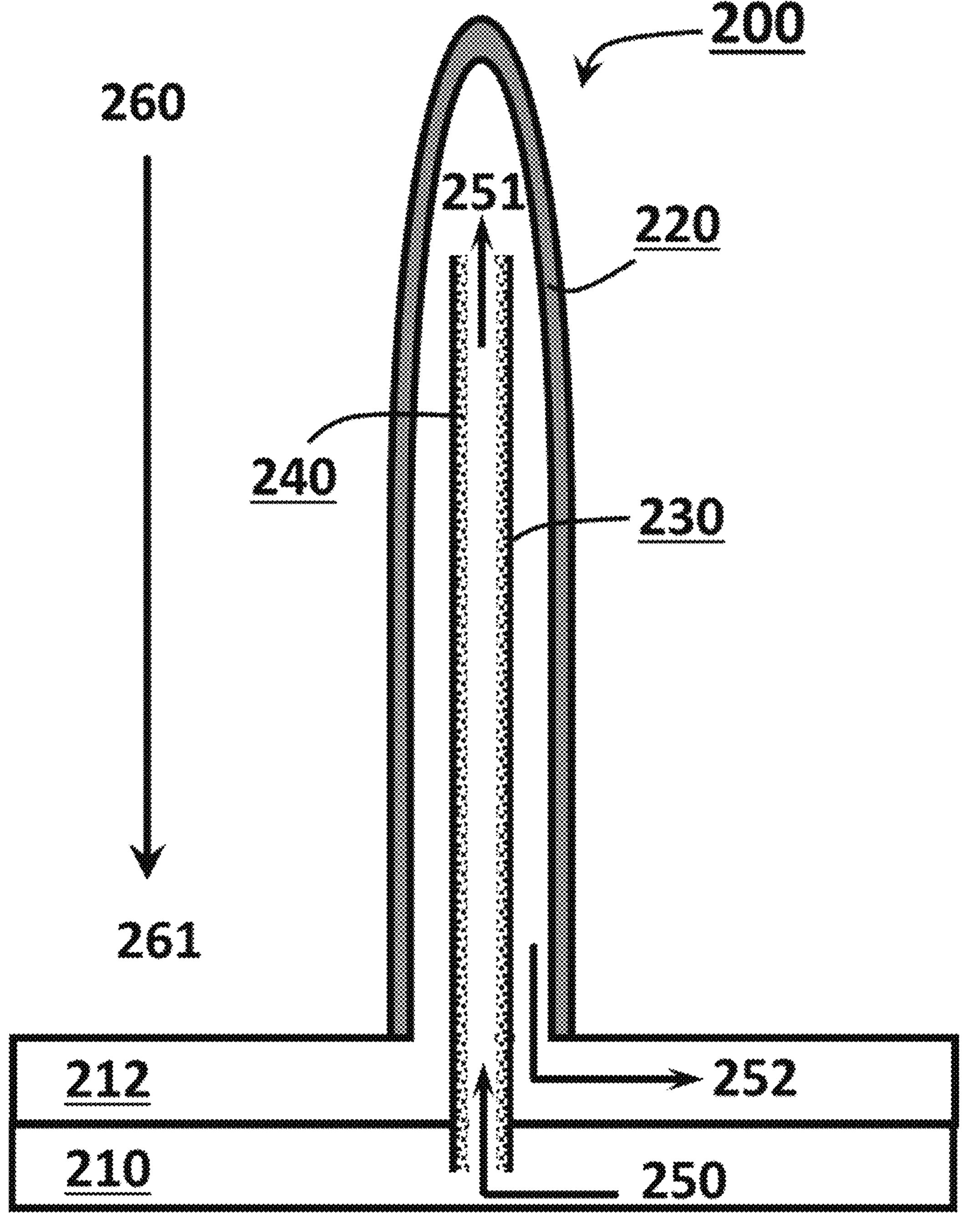
FIG. 2 illustrates a hydrogen production system having a tubular electrochemical reactor, according to an embodiment of this disclosure.

FIG. 2 illustrates a hydrogen production system 200 having a tubular electrochemical reactor integrated with CPOX reaction capabilities, according to an embodiment of this disclosure. 220 represents a tubular reactor as discussed herein having an open end and a closed end. The reactor has an anode on the inside and a cathode on the outside with an electrolyte between the anode and the cathode. In various embodiments, the electrolyte is mixed conducting. In various embodiments, the electrolyte comprises an electronically conducting phase and an ionically conducting phase. In some cases, the electronically conducting phase comprises doped lanthanum chromite or an electronically conductive metal or combination thereof and wherein the ionically conducting phase comprises a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia (SCZ), and combinations thereof.

230 represents a feed tube extending into the open end of the reactor and toward the closed end of the reactor. In various embodiments, the feed tube contains a catalyst 240 that promotes catalytic partial oxidation (CPOX) reactions. For example, the catalyst is coated on the inside of the feed tube such that when a hydrocarbon and an oxidant in anode feed stream 250 are passed through the feed tube into the reactor, CPOX reactions take place. In various embodiments, the hydrocarbon comprises methane. In various embodiments, the hydrocarbon comprises natural gas.

The CPOX catalyst may be incorporated into the feed tube in any fashion as is known to one skilled in the art. For example, a ceramic coating is applied to the inside of the feed tube and then fired in a furnace. In various embodiments, the ceramic coating is made from alumina, ceria, zirconia, or combinations thereof. The ceramic coating is then impregnated with a platinum/rhodium nitrate solution. In various embodiments, the nitrates are eliminated, e.g., by being oxidized and gasified, or by being burned off.

The anode feed stream 250 (e.g., hydrocarbon and oxidant) is supplied via manifold 210. In various embodiments, the oxidant is completely consumed before exiting the feed tube. The anode of the reactor is configured to receive the product 251 of the CPOX reactions and oxidize the product electrochemically. 252 represents anode exhaust stream which is extracted through manifold 212.

The system also comprises a steam generator (not shown), which generator provides steam in cathode feed stream 260 to the outside of the tubular reactor 220. Steam is converted to hydrogen electrochemically by the cathode of the reactor. 261 represents the cathode exhaust stream. In some embodiments, cathode feed stream 260 also contains hydrogen.

The steam generator produces steam from water. In an embodiment, the steam that enters the electrochemical reactor has a temperature of no less than 600° C., or no less than 700° C., or no less than 800° C., or no less than 850° C., or no less than 900° C., or no less than 950° C., or no less than 1000° C., or no less than 1100° C. In an embodiment, the steam that enters the electrochemical reactor has a pressure of no greater than 10 psi, or no greater than 5 psi, or no greater than 3 psi.

In various embodiments, both the anode and the cathode are exposed to reducing environments during the entire time of operation. In some cases, the anode and the cathode have the same elements. In some cases, the anode and the cathode and the electrolyte have the same elements. In some cases, the anode and the cathode comprise Ni or NiO and a material selected from the group consisting of YSZ, CGO, SDC, SSZ, LSGM, and combinations thereof.

In an embodiment, the electrolyte comprises CoCGO or LST (lanthanum-doped strontium titanate)-stabilized zirconia. In an embodiment, the stabilized zirconia comprises YSZ or SSZ or SCZ (scandia-ceria-stabilized zirconia). In an embodiment, the LST comprises $LaSrCaTiO_3$. In an embodiment, the electrolyte comprises Nickel, Copper, Cobalt, Lanthanum, Strontium, Titanium, or Niobium-doped zirconia.

In an embodiment, a method of producing hydrogen is discussed, comprising: (a) providing a tubular reactor having an open end and a closed end, wherein the reactor comprises an anode on the inside and a cathode on the outside separated by and in contact with a mixed conducting electrolyte, wherein the electrolyte comprises an electronically conducting phase and an ionically conducting phase, wherein the reactor comprises no current collector or interconnect; (b) introducing a hydrocarbon and an oxidant into a feed tube, wherein the feed tube contains a catalyst that promotes catalytic partial oxidation (CPOX) reactions, wherein the feed tube extends into the open end of the reactor and toward the closed end of the reactor; (c) introducing steam to the outside of the tubular reactor; and (d) converting steam to hydrogen electrochemically without electricity input.

In an embodiment, the method comprises using the produced hydrogen in one of Fischer-Tropsch (FT) reactions, dry reforming reactions, Sabatier reaction catalyzed by nickel, Bosch reaction, reverse water gas shift reaction, electrochemical reaction to produce electricity, production of ammonia, production of fertilizer, electrochemical compressor for hydrogen storage, fueling hydrogen vehicles or hydrogenation reactions or combinations thereof.

It is to be understood that this disclosure describes exemplary embodiments for implementing different features, structures, or functions of the invention. Exemplary embodiments of components, arrangements, and configurations are described to simplify the present disclosure; however, these exemplary embodiments are provided merely as examples and are not intended to limit the scope of the invention. The embodiments as presented herein may be combined unless otherwise specified. Such combinations do not depart from the scope of the disclosure.

Additionally, certain terms are used throughout the description and claims to refer to particular components or steps. As one skilled in the art appreciates, various entities may refer to the same component or process step by different names, and as such, the naming convention for the elements described herein is not intended to limit the scope of the invention. Further, the terms and naming convention used herein are not intended to distinguish between components, features, and/or steps that differ in name but not in function.

While the disclosure is susceptible to various modifications and alternative forms, specific embodiments thereof are shown by way of example in the drawings and description. It should be understood, however, that the drawings and detailed description are not intended to limit the disclosure to the particular form disclosed, but on the contrary, the intention is to cover all modifications, equivalents and alternatives falling within the spirit and scope of this disclosure.

What is claimed is:

1. A hydrogen production system comprising:

a tubular reactor having an open end and a closed end, wherein the reactor comprises an anode on the inside and a cathode on the outside separated by and in contact with a mixed conducting electrolyte;

a feed tube extending into the open end of the reactor and toward the closed end of the reactor, wherein the feed tube contains a catalyst that promotes catalytic partial oxidation (CPOX) reactions; and a steam generator;

wherein the steam generator provides steam to the outside of the tubular reactor; and wherein the reactor comprises no current collector or interconnect.

2. The system of claim 1, wherein the reactor generates no electricity and receives no electricity.

3. The system of claim 1, wherein both the anode and the cathode are exposed to reducing environments during the entire time of operation.

4. The system of claim 1, wherein the feed tube is configured to receive a hydrocarbon and an oxidant.

5. The system of claim 4, wherein the oxidant is consumed completely before exiting the feed tube.

6. The system of claim 1, wherein the cathode is configured to convert steam to hydrogen electrochemically.

7. The system of claim 1, wherein the anode is configured to receive product of the CPOX reactions and oxidize the product electrochemically.

8. The system of claim 1, wherein the anode and the cathode have the same elements.

9. The system of claim 1, wherein the anode and the cathode and the electrolyte have the same elements.

10. The system of claim 1, wherein the anode and the cathode comprise Ni or NiO and a material selected from the group consisting of YSZ, CGO, SDC, SSZ, LSGM, and combinations thereof.

11. The system of claim 1, wherein the electrolyte comprises an electronically conducting phase and an ionically conducting phase.

12. The system of claim 11, wherein the electronically conducting phase comprises doped lanthanum chromite or an electronically conductive metal or combination thereof and wherein the ionically conducting phase comprises a material selected from the group consisting of gadolinium or samarium doped ceria, yttria-stabilized zirconia (YSZ), lanthanum strontium gallate magnesite (LSGM), scandia-stabilized zirconia (SSZ), Sc and Ce doped zirconia (SCZ), and combinations thereof.

13. The system of claim 1, wherein the electrolyte comprises CoCGO or LST (lanthanum-doped strontium titanate)-stabilized zirconia.

14. The system of claim 13, wherein the stabilized zirconia comprises YSZ or SSZ or SCZ (scandia-ceria-stabilized zirconia), and wherein the LST comprises $LaSrCaTiO_3$.

15. The system of claim 1, wherein the electrolyte comprises Nickel, Copper, Cobalt, Lanthanum, Strontium, Titanium, or Niobium-doped zirconia.

16. A method of producing hydrogen comprising:

a. providing a tubular reactor having an open end and a closed end, wherein the reactor comprises an anode on the inside and a cathode on the outside separated by and in contact with a mixed conducting electrolyte, wherein the electrolyte comprises an electronically conducting phase and an ionically conducting phase, wherein the reactor comprises no current collector or interconnect;

b. introducing a hydrocarbon and an oxidant into a feed tube, wherein the feed tube contains a catalyst that promotes catalytic partial oxidation (CPOX) reactions, wherein the feed tube extends into the open end of the reactor and toward the closed end of the reactor;

c. introducing steam to the outside of the tubular reactor; and d. converting steam to hydrogen electrochemically without electricity input.

17. The method of claim 16, wherein both the anode and the cathode are exposed to reducing environments during the entire time of operation.

18. The method of claim 16, wherein the oxidant is consumed completely before exiting the feed tube.

19. The method of claim 16, wherein the anode and the cathode have the same elements.

20. The method of claim 16, wherein the anode and the cathode and the electrolyte have the same elements.

21. The method of claim 16, wherein the anode and the cathode comprise Ni or NiO and a material selected from the group consisting of YSZ, CGO, SDC, SSZ, LSGM, and combinations thereof.

22. The method of claim 16, wherein the electrolyte comprises CoCGO or LST (lanthanum-doped strontium titanate)-stabilized zirconia.

23. The method of claim 22, wherein the stabilized zirconia comprises YSZ or SSZ or SCZ (scandia-ceria-stabilized zirconia), and wherein the LST comprises $LaSrCaTiO_3$.

24. The method of claim 16, wherein the electrolyte comprises Nickel, Copper, Cobalt, Lanthanum, Strontium, Titanium, or Niobium-doped zirconia.

* * * * *